(12) United States Patent
Brake et al.

(10) Patent No.: US 11,630,438 B2
(45) Date of Patent: Apr. 18, 2023

(54) DETERMINING A CUT PATTERN OF A LATHE METHOD, CONTROL DEVICE, AND LATHE

(71) Applicant: Siemens Industry Software Inc., Plano, TX (US)

(72) Inventors: Sebastian Brake, Cologne (DE); Reinhard Rinas, Cologne (DE)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/784,033

(22) PCT Filed: Dec. 13, 2019

(86) PCT No.: PCT/US2019/066319
§ 371 (c)(1),
(2) Date: Jun. 9, 2022

(87) PCT Pub. No.: WO2021/118603
PCT Pub. Date: Jun. 17, 2021

(65) Prior Publication Data
US 2023/0012457 A1    Jan. 12, 2023

(51) Int. Cl.
*G05B 19/4093* (2006.01)

(52) U.S. Cl.
CPC . *G05B 19/40935* (2013.01); *G05B 19/40937* (2013.01); *G05B 2219/35167* (2013.01); *G05B 2219/36204* (2013.01); *G05B 2219/49392* (2013.01)

(58) Field of Classification Search
None
See application file for complete search history.

(56) References Cited

U.S. PATENT DOCUMENTS

| 2013/0218319 | A1 | 8/2013 | Holt |
| 2018/0095443 | A1 | 4/2018 | Haga et al. |
| 2020/0050168 | A1* | 2/2020 | Matsumura ........ G05B 19/4093 |

OTHER PUBLICATIONS

International Preliminary Report for International Application No. PCT/US2019/066319 dated Jun. 23, 2022.
PCT International Search Report and Written Opinion corresponding to PCT International Application No. PCT/US2019/066319, dated Aug. 3, 2020, pp. 1-14.

* cited by examiner

*Primary Examiner* — Ryan A Jarrett
(74) *Attorney, Agent, or Firm* — Lempia Summerfield Katz LLC (57) ABSTRACT

A computer-implemented method is provided for determining a cut pattern of a lathe. The lathe is numerically controlled by a control device and includes a tool with a cutter acting on a workpiece. The workpiece has a start contour and a target contour to be achieved by cutting the workpiece according to the cut pattern. The method includes determining a path of a n-th layer of the cut pattern, wherein the n-th layer includes: for n≥2: an infeed path linear and/or parallel to the target contour; a circular infeed path starting tangent to the target contour; an intermediate path linear and/or parallel to the target contour; a circular outfeed path ending tangent to the target contour; and for n≥2: a smoothing path linear and/or parallel to the target contour.

19 Claims, 4 Drawing Sheets

1 Cut pattern
2 Lathe
3 Tool
4 Cutter
5 Workpiece
6 Control device
7 Start contour
8 Target contour
10 Computer-readable medium
100 Product system

FIG 1

1 Cut pattern
2 Lathe
3 Tool
4 Cutter
5 Workpiece
6 Control device
7 Start contour
8 Target contour
10 Computer-readable medium
100 Product system

DETERMINING A CUT PATTERN OF A LATHE METHOD, CONTROL DEVICE, AND LATHE

The present patent document is a § 371 nationalization of PCT Application Serial No. PCT/US2019/066319, filed Dec. 13, 2019, designating the United States, which is hereby incorporated by reference.

TECHNICAL FIELD

The present disclosure is directed, in general, to turning where materials, (e.g., extremely hard materials), have to be machined, (e.g., turbine manufacturing). For such purposes, lathes, metal lathes, or metalworking lathes or machines generally suitable for turning machining are used, whereby such machines may be controlled numerically by a control device or processor, and whereby software solutions for computer-aided design/manufacturing/engineering (CAD/CAM/CAE) are used to support or control the machining process (collectively referred to herein as product systems).

BACKGROUND

Machine tools, in particular lathes, are widely used to machine workpieces. Such lathes may include a tool with a cutter acting on the workpiece and are numerically controlled by a control device. Machining a workpiece regularly involves comprehensive and time-consuming preparatory acts to provide a good quality of the machined workpiece, to avoid an excessive tool or cutter wear, and to provide efficiency with respect to time and costs.

The present disclosure generally relates to machining of workpieces using lathes, in particular to determining a cut pattern of a lathe.

Currently, there exist product systems and solutions which support machining of workpieces using lathes and determining a cut pattern of a lathe. Such product systems may benefit from improvements.

SUMMARY

Variously disclosed embodiments include methods, control devices, and lathes that may be used to facilitate machining of workpieces using lathes, and in particular to facilitate determining a cut pattern of a lathe.

The scope of the present disclosure is defined solely by the appended claims and is not affected to any degree by the statements within this summary. The present embodiments may obviate one or more of the drawbacks or limitations in the related art.

According to a first aspect, a computer-implemented method for determining a cut pattern of a lathe is provided which is numerically controlled by a control device and which includes a tool with a cutter acting on a workpiece, the workpiece having a start contour and a target contour to be achieved by cutting the workpiece according to the cut pattern, wherein the method may include determining a path of a n-th layer of the cut pattern, the n-th layer including: for $n \geq 2$: an infeed path which is linear and/or parallel to the target contour starting at point $E\_n-1$ and ending at point $S\_n$; a circular infeed path starting tangent to the target contour at point $S\_n$ with a radius $rS\_n$ and ending at point $IS\_n$; an intermediate path which is linear and/or parallel to the target contour starting at point $IS\_n$ and ending at point $IE\_n$; a circular outfeed path starting at point $IE\_n$ and ending tangent to the target contour at point $E\_n$ with a radius $rE\_n$; and for $n \geq 2$: a smoothing path which is linear and/or parallel to the target contour starting at point $E\_n$, including point $S\_n-1$, and ending at point $E\_n$.

By way of example, the described computer-implemented method may be carried out through operation of the control device, the lathe, and/or at least one processor.

For example, the start contour and/or the target contour may be provided to the control device or to the lathe by a user, (e.g., using via a graphical user interface (GUI), an input device, a display, or the like). In another example, the start contour may be provided to the control device or to the lathe by detecting the start geometry of the workpiece. Alternatively, or additionally, the start contour and/or the target contour may be provided to the control device or to the lathe by transmitting corresponding data from a design software, e.g., computer-aided design (CAD), product lifecycle management software (PLM software), or other suitable software.

In example embodiments, the start contour of the workpiece may include cylindric areas and the target contour of the workpiece may include chambers or grooves which are to be cut by the lathe.

In an embodiment, the control device and/or the lathe includes at least one processor and/or a numerical controller arranged and configured to carry out the method act(s).

For example, the lathe may be a metal lathe or metalworking lathe. In an example embodiment, the described computer-implemented method may be used for rough cuts.

According to a second aspect, a control device for numerically controlling a lathe is provided which includes a tool with a cutter acting on a workpiece, the workpiece having a start contour and a target contour to be achieved by cutting the workpiece according to a cut pattern, wherein the control device may be arranged and configured to determine the cut pattern of the lathe by determining a path of a n-th layer of the cut pattern, the n-th layer including: for $n \geq 2$: an infeed path which is linear and/or parallel to the target contour starting at point $E\_n-1$ and ending at point $S\_n$; a circular infeed path starting tangent to the target contour at point $S\_n$ with a radius $rS\_n$ and ending at point $IS\_n$; an intermediate path which is linear and/or parallel to the target contour starting at point $IS\_n$ and ending at point $IE\_n$; a circular outfeed path starting at point $IE\_n$ and ending tangent to the target contour at point $E\_n$ with a radius $rE\_n$; and for $n \geq 2$: a smoothing path which is linear and/or parallel to the target contour starting at point $E\_n$, including point $S\_n-1$, and ending at point $E\_n$.

According to a third aspect, a lathe may include a tool with a cutter acting on a workpiece, the workpiece having a start contour and a target contour to be achieved by cutting the workpiece according to a cut pattern, wherein the lathe may be controlled numerically by this control device for numerically controlling a lathe. In particular, the lathe and/or the described control device may be arranged and configured to determine a path of a n-th layer of the cut pattern, the n-th layer including: for $n \geq 2$: an infeed path which is linear and/or parallel to the target contour starting at point $E\_n-1$ and ending at point $S\_n$; a circular infeed path starting tangent to the target contour at point $S\_n$ with a radius $rS\_n$ and ending at point $IS\_n$; an intermediate path which is linear and/or parallel to the target contour starting at point $IS\_n$ and ending at point $IE\_n$; a circular outfeed path starting at point $IE\_n$ and ending tangent to the target contour at point $E\_n$ with a radius $rE\_n$; and for $n \geq 2$: a smoothing path which is linear and/or parallel to the target contour starting at point $E\_n$, including point $S\_n-1$, and ending at point $E\_n$.

According to a fourth aspect, a computer-readable medium encoded with executable instructions, that when executed, cause the described control device or lathe to carry out the described method of determining a cut pattern of a lathe. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods for machining of workpieces using lathes, in particular for determining a cut pattern of a lathe, in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document will be described with reference to exemplary non-limiting embodiments.

Figure 1:
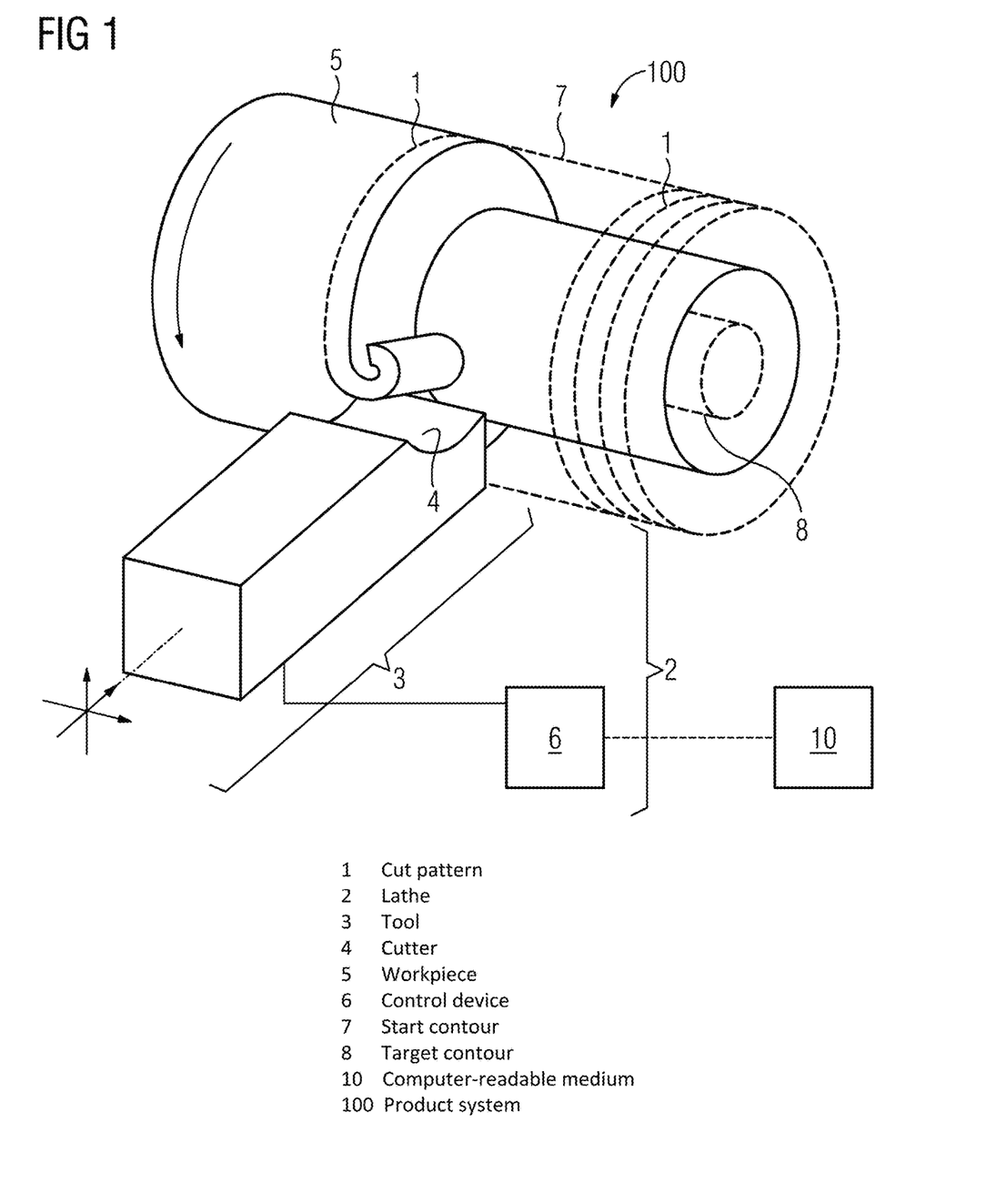
FIG. 1 illustrates a diagram of an example product system that facilitates machining of workpieces using lathes, in particular to determining a cut pattern of a lathe.

With reference to FIG. 1, an example product system 100 is illustrated that facilitates machining of a workpiece 5 using a lathe 2, and in particular determining a cut pattern 1 of a lathe 2. The product system 100 may include a tool 3 with a cutter 4 which may act on the workpiece 5 which may be rotating as indicated with a corresponding arrow. The workpiece 5 may have a start contour 7 which is, by way of example cylindrical, and may further have a target contour 8 which may include chambers or grooves. To achieve the target contour 8 the cutter 4 cuts the workpiece 5 according to a cut pattern 1 which may include several layers. Accordingly, material of the workpiece 5 may be cut and thus removed act-by-act and/or sequentially from the workpiece 5.

For the facilitated machining of workpieces 5 and determination of the cut pattern 1, the start contour 7 and the target contour 8 are provided to the control device 6 or the product system 100. This may be done by a user using, e.g. via a graphical user interface (GUI), an input device, a display or the like. Alternatively, or additionally, the start contour 7 and/or the target contour 8 may be provided by transmitting corresponding data from a design software, (e.g., CAD), product lifecycle management software (PLM software) or other suitable software to the control device 6 or the present product system 100. Based on the provided start contour 7 and target contour 8, the cut pattern 1 may be determined as described below. The cut pattern 1 may include a number n layers, that is to say several layers, which are cut subsequently from the workpiece 5. Each layer may include several paths which may connect the different layers to the cut pattern. By way of example, the cut pattern 1 may constitute a contiguous cut.

It may be difficult and time-consuming to machine workpieces 5 using lathes 2, in particular to determine a cut pattern 1 of a lathe 2. For example, advanced coding knowledge of users may be required, or selections of many options need to be made consciously, both involving many manual acts, which is a long and not efficient process.

Examples of product systems 100 that may be configured to include the features for machining of workpieces 5 using lathes 2, in particular for determining a cut pattern 1 of a lathe 2, described herein may include the software NX, in particular NX/CAM for Turning, of Siemens Industry Software Inc. (formerly known as Siemens Product Lifecycle Management Inc.), of Plano, Tex., USA. This software solution provides CAD/CAM/CAE tools for Design (e.g., parametric and direct solid/surface modelling), engineering analysis (e.g., static; dynamic; electro-magnetic; thermal, using the finite element method; and fluid, using the finite volume method), and manufacturing finished design by using included machining modules. However, the systems and methods described herein may be used in other product systems (e.g., PLM, PDM, ALM systems) and/or any other type of system that generates and stores product data in a database.

According to an embodiment, the control device 6 is arranged and configured to control the lathe 2 such that the workpiece 5 is cut according to the determined cut pattern 1. Hence, the determined cut pattern 1 may be used to operate the lathe 2 accordingly.

Figure 2:
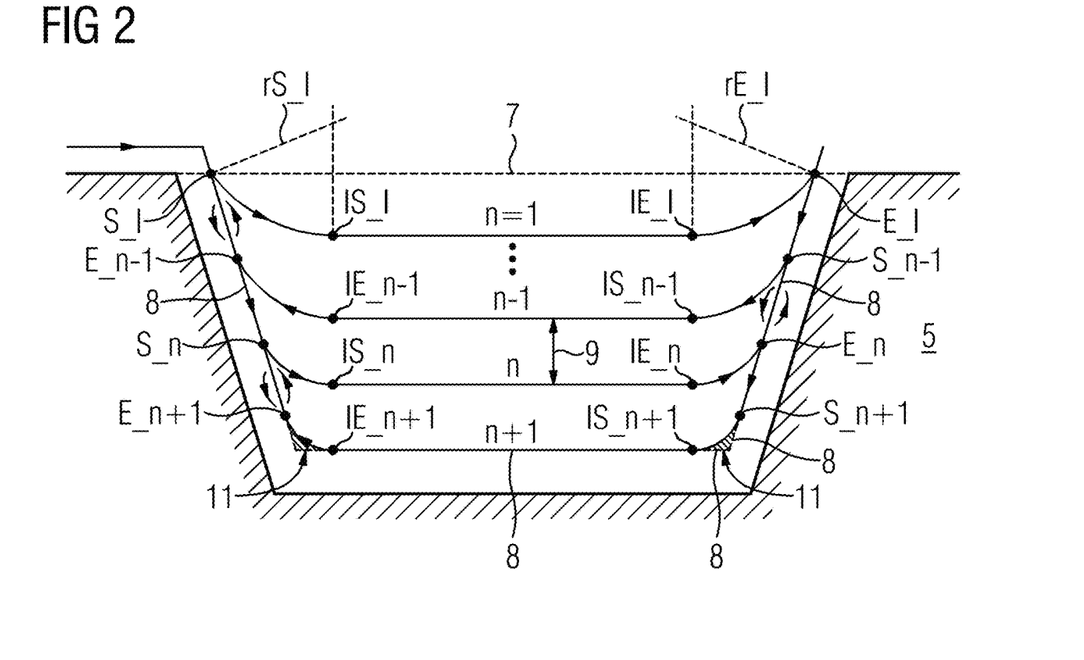
FIGS. 2-4 illustrate a series of exemplary cut patterns determined using the product system shown in FIG. 1.
Figure 3:
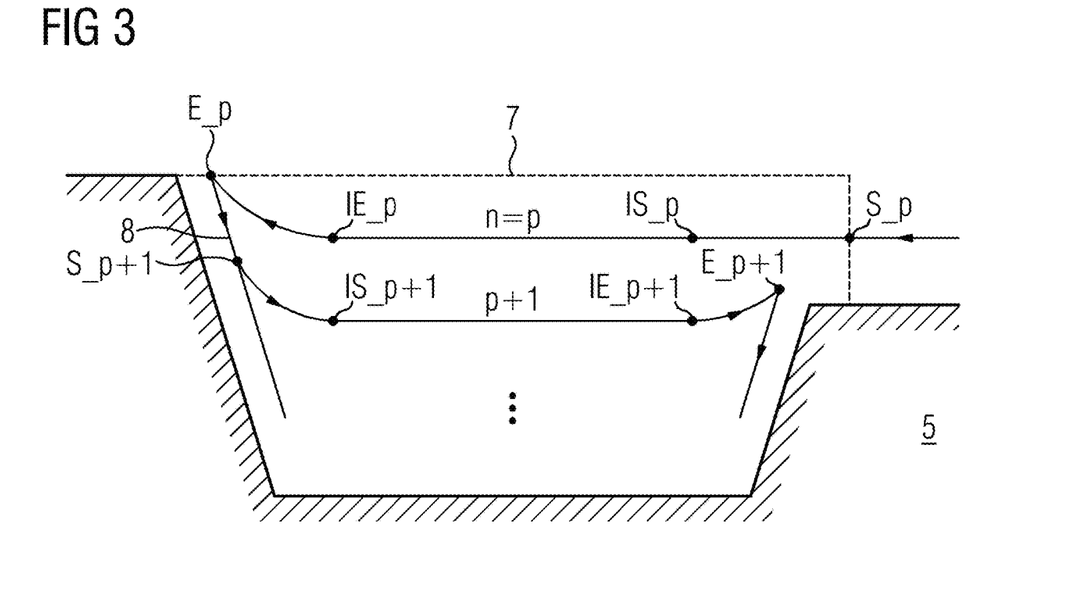
Figure 4:
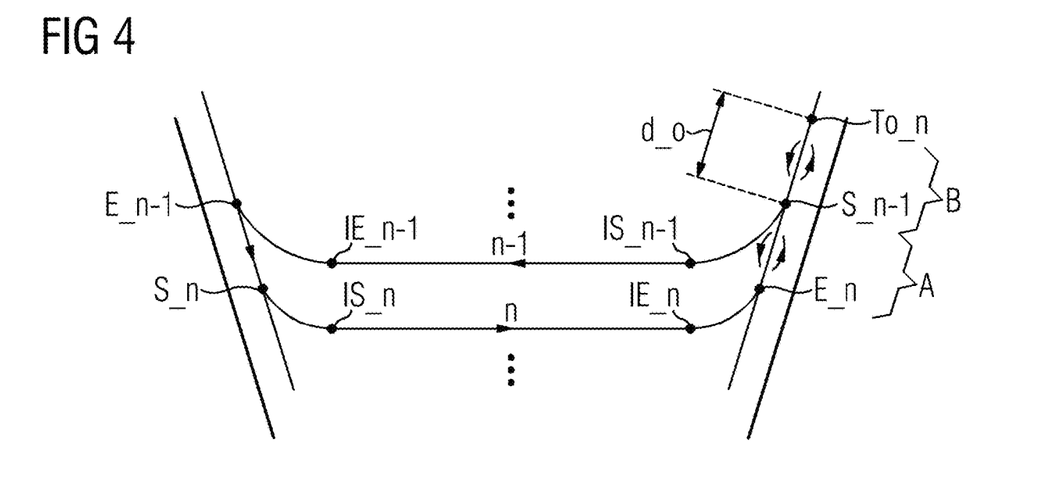

Referring now to FIGS. 2-4, a series of exemplary cut patterns 1 determined using the product system 100 shown in FIG. 1 is illustrated.

FIG. 2 illustrates a first exemplary cut pattern 1. According to the example, the cut pattern 1 may include a circular infeed path starting tangent to the target contour 8 at point S_n with a radius rS_n and ending at point IS_n. The cut pattern 1 may further include an intermediate path which is linear and/or parallel to the target contour 8 starting at point IS_n and ending at point IE_n. Further, the cut pattern 1 may include a circular outfeed path starting at point IE_n and ending tangent to the target contour 8 at point E_n with a radius rE_n. By way of example, in particular if the groove to be machined and the start contour 7 are symmetric along the rotating axis of the workpiece 5, the circular infeed path and the circular outfeed path may be symmetric, and the radii rS_n and rE_N may be equal.

In particular, for the first layer of a groove which is symmetric along the rotating axis of the workpiece 5, such a circular infeed path and circular outfeed path may provide a gradual increase of the load of the tool 3 which helps to reduce tool wear.

The cut pattern 1 may further include an infeed path which is linear and/or parallel to the target contour 8 starting at point E_n−1 and ending at point S_n, thus connecting the layer n−1 to the layer n of the cut pattern 1. This infeed path may particularly be used for layers subsequent to the first layer of a groove which is symmetric along the rotating axis of the workpiece 5 and also helps to reduce tool wear by gradually increasing the load of the tool 3.

Further, the cut pattern 1 may include a smoothing path which is linear and/or parallel to the target contour 8 starting at point E_n, including point S_n−1, and ending at point E_n. This smoothing path may particularly be used for layers subsequent to the first layer, e.g., of a groove which is symmetric along the rotating axis of the workpiece 5. The smoothing path may result in a smooth and even side wall of the chamber or groove to be machined and avoids unevenness and "bumps".

In an embodiment for the n-th layer, the circular infeed path may end at point IS_n tangent to the intermediate path starting at point IS_n, wherein the circular outfeed path may start at point IE_n tangent to the intermediate path ending at point IE_n.

In this embodiment, the circular infeed path and the circular outfeed path may comply with the concept of "bi-tangency". This means that the circular infeed path may be both, at its starting point S_n, tangent to the first side wall of the chamber or groove to be machined and, at its endpoint IS_n, tangent to the subsequent intermediate path, in particular tangent to the ground of the chamber or groove. Analogously, the circular outfeed path may be both, at its starting point IE_n, tangent to the preceding intermediate path, in particular tangent to the ground of the chamber or groove and, at its endpoint E_n, tangent to the second side wall of the chamber or groove.

According to another embodiment, the radii of the circular infeed and outfeed paths rS_i and rE_i of the initial layer may be larger than the radii of the circular infeed and outfeed paths rS_f and rE_f of the final layer of the cut pattern 1.

This embodiment of the circular infeed paths and circular outfeed paths of different layers n of the cut pattern 1 may further reduce tool wear by gradually, from layer to layer, increasing the load of the tool 3. Consequently, for the initial layers less tool wear is caused, whereas, e.g., for the final layer at the bottom of the chamber or groove, only very small remainders of materials remain in the corners 11.

According to another embodiment, the radius rS_n and the end point IE_n of the respective circular infeed path as well as the radius rE_n and the start point IS_n of the respective circular outfeed path may be determined such that a given maximum cut depth 9 is respected.

The given maximum cut depth 9 may depend on the material of the workpiece 5, e.g., the hardness of the material. Further, the given maximum cut depth 9 may depend on one of the material and geometry of cutter 4, the rotational speed of the rotating the piece 5, the infeed speed of the cutter 4 relative to the workpiece 5, or any combination thereof. In some applications, a maximum cut depth 9 may be of the order of one third of the cutter diameter or smaller if the material of the workpiece 5 is harder.

The mentioned geometry, e.g., the mentioned radii rS_n, rE_n and the different starting points and endpoints IE_n, IS_n are chosen such that for each layer, the cutting depth does not exceed the given maximum cut depth 9. This means in particular that the given maximum cut depth 9 is respected during the circular infeed path, the intermediate path, and the circular outfeed path of the respective layer. Respecting these boundary conditions results in a longer lifetime of the cutter 4 by causing less tool wear.

The given maximum cut depth 9 may, for example, be input to the control device 6 or the product system 100 by a user or connected software system. Alternatively, or additionally, the given maximum cut depth 9 may be calculated by the control device 6 or the product system 100 based on the above-mentioned parameters which are input to the control device 6 or the product system 100.

By way of example, the radius rS_n of the circular infeed path and the radius rE_n of the circular outfeed path may be decreased from layer n to layer n+1, respectively.

Consequently, the radius of the first layer rS_1, rE_1 is larger than the radius of the final layer rS_f, rE_f. In some applications, the radii of the first layer may be chosen to be 1.5 times the radii of the final layer. The reduction of the radii with increasing number of layers, with getting closer and closer to the ground of the chamber or groove to be machined, has several advantages. For the upper layers, tool wear may be reduced without significant drawbacks, e.g., increased machining time or the like. For the bottom-most layer, (e.g., at the ground of the chamber or groove), a minimal radius may be chosen so that a minimum amount of material remains in the corners 11 of the chamber or groove to be machined.

By way of example, the radius rS_n, rE_n may continuously be decreased from layer to layer, e.g., rS_n>rS_n+1 and rE_n>rE_n+1.

In another example embodiment, the radius rS_f of the circular infeed path and the radius rE_f of the circular outfeed path of the final layer may be determined such that a maximum amount of material of the workpiece 5 is removed and such that a given limit of change of direction of the tool 3 with the cutter 4 is respected.

In order to remove as much as material of the workpiece 5 in the corners 11 of chambers or groove, a very small radius rS_f, rE_f in the final layer is desirable. However, boundary conditions including a limit of change of direction of the tool 3 need to be observed. Changing the direction of the tool 3 involves forces on the tool which may occur abruptly and may be large in magnitude, in particular, if very small radii or abrupt changes of direction characterize the movement of the tool 3. Hence, there may be maximum forces which may be exerted to the tool 3 and which correspond to a minimum radius that may only be used for the movement of the tool 3, wherein the chosen radius does not go below this minimum radius. Consequently, for the final layer a radius is chosen for the movement of the tool 3 which both is as small as possible for the purposes of removing as much material in the corner 11 of the chamber or groove as possible and complies with the minimum radius determined for the movement of the tool 3.

The given limit of change of direction of the tool 3 may, by way of example, be input to the control device 6, the lathe 2 or the product system 100 by a user. Alternatively, or additionally, this information may be calculated if the required information is provided to the control device 6, the lathe 2 or the product system 100.

By way of example, for a start contour 7 and/or a target contour 8 which does not require a circular infeed path for a given p-th layer with p<i, a linear infeed path is determined which is linear and/or parallel to the target contour 8 starting at point S_p and ending at point IS_p. Alternatively, or additionally, for a start contour 7 and/or a target contour 8 which does not require a circular outfeed path for a given p-th layer with p<i, a linear outfeed path is determined which is linear and/or parallel to the target contour 8 starting at point IE_p and ending at point E_p. By way of example, the linear infeed path is parallel to the target contour 8 at the ground of the chamber or groove to be machined.

FIG. 3 illustrates a second exemplary cut pattern 1 which may correspond to the above example of a linear infeed path for a given p-th layer. According to this example, the start contour 7 and the target contour 8 are not symmetric along the rotating axis of the workpiece 5. In particular, for such start contours 7 and target contours 8, the circular infeed path or the circular outfeed path (depending on the tool path of the respective layer) is not required at least for the topmost layer of the cut pattern 1. For these cases, (again, depending on the tool path of the respective layer), a linear infeed path is determined which is linear and/or parallel to the target contour 8 starting at point S_p and ending at point IS_p or a linear outfeed path is determined which is linear and/or parallel to the target contour 8 starting at point IE_p and ending at point E_p.

More particularly, the cut pattern 1 begins at the right-hand side of FIG. 3 with a linear infeed path at point S_p, then continues to the left two point IS_p where it is linearly continued by the intermediate path. At the left corner, the cut pattern 1 is continues with the regular circular outfeed path from point IE_p to point E_p, then the regular linear infeed path from point E_p to point S_p+1 is used, followed by the regular circular in feed path from point S_p+1 to point IS_p+1. After the subsequent intermediate path from point IS_p+1 to IE_p+1, an adapted circular outfeed path from point IE_p+1 to point E_p+1 with an adapted radius rE_p+1 is applied such that a smooth transition from the adapted cut pattern of FIG. 3 to the regular cut pattern of FIG. 2 may be achieved.

This adapted cut pattern according to FIG. 3 may be applied if the topmost point of a given layer according to the regular cut pattern according to FIG. 2 would be higher than the wall of the target contour 8. The adapted cut pattern may be applied layer by layer to such cases as long as the topmost point of a given layer is still higher than the wall of the target contour—hence, p<I (and in FIG. 3: p+1<i). As soon as this condition is no more met, (e.g., the topmost point of a given layer according to the regular cut pattern is lower than the wall of the target contour 8), a transition to the regular cut pattern is made so that a linear infeed path is no more applied.

According to yet another example, the n-th layer further includes an overlap path subsequent to the smoothing path of the n-th layer, wherein for the overlap path the movement along the smoothing path is continued linearly and/or parallelly to the target contour 8 starting at point S_n−1 for a distance d_o until a point To_n, and ending at point S_n−1. By way of example, the overlap path is parallel to the target contour 8 at the wall of the chamber or groove to be machined.

FIG. 4 illustrates a third exemplary cut pattern 1 which may correspond to the above example of an overlap path for a given n-th layer. According to this example, the smoothing path (labeled with "A") for the n-th layer starting at point E_n and going to point S_n−1 is interrupted by continuing the tool's movement along the overlap path (labeled with "B") starting at point S_n−1 until point To_n where it turns and returns to point S_n−1. After completion of the overlap path, the regular smoothing path is continued at point S_n−1 to finally end at point E_n.

This overlap path is particularly advantageous for smooth walls of a chamber or groove to be machined. During regular machining, chips are removed from the workpiece 5 by the cutter 4. Such chips may hit and reconnect to the workpiece 5 at a different position, including the walls of the chamber or groove. By applying the cutter 4 along the overlap path, such reconnected chips are removed resulting in an even and smooth wall of the chamber or groove.

The overlap path may be applied for layers below the topmost layer, e.g., n>2 of the regular cut pattern and may also be applied to the higher wall of the adapted cut pattern explained in the context of FIG. 3.

In particular, the above examples are equally applicable to the control device 6, to the lathe 2 and to the corresponding computer-readable medium 10 explained in the present patent document, respectively.

According to another approach, tool path patterns for roughing do not maintain uniform tangential force, material removal rate and chip loading. However, in order to perform a proper rough cut, it is very important to load the tool 3 gradually while it feeds into the material, then continue to cut at the desired cut depth, and, finally, to unload the tool 3 gradually again. Abrupt changes of direction of cutting moves of the tool, especially when the wall of the feature to cut is approached, must therefore be avoided.

The described computer-implemented method for facilitating machining of workpieces using lathes, and in particular for facilitating determining a cut pattern of a lathe may contribute to comply with these specifications by using an optimized cut pattern. This optimized cut pattern may create rough cuts with smooth infeed and outfeed moves and also provides a contiguous roughing pattern where each of the rough cuts to be made is connected to its predecessor. This provides less tool wear and a resulting improved surface quality with no scallops remaining on the part. Furthermore, it has positive thermal effects, because the tool does not lose contact with the workpiece surface.

In other approaches, the amount of rest material in the corners 11 of the pocket tends to be increased due to the smoothed cutting motions at the beginning and the end of the rough cuts. Thanks to the suggested optimized cut pattern, however, the circular infeed and outfeed moves are optimized, in order to remove as much material as possible in corners 11 already along the last rough cut in the pattern. The optimization of the circular infeed and outfeed moves is in particular achieved thanks to the reduction of the radii $rS\_i$ and $rE\_i$ from the initial layer to the final layer $rS\_f$ and $rE\_f$. By way of example, the radii of the final layer $rS\_f$ and $rE\_f$ are minimal in the determined cut pattern 1.

By way of example, the described computer-implemented method includes three main computational acts that are explained in the following: Computation of smooth rough cuts; optimization of smoothing radius, and contiguous rough cuts creation.

Concerning the computation of smooth rough cuts, the above-mentioned concept of bi-tangency means that bi-tangent linear roughing provides smooth cutting by way of guiding the tool 3 into the material along a circular infeed. This circular cutting move is tangent to the part or workpiece 5 target contour 8 as first important condition in the concept of bi-tangency and its radius is determined by a given smoothing radius.

Secondly, it tangentially leads into the full linear rough cut to be made up to the other side of the area to machine. That characteristic suggested to use the term "bi-tangency" in this context. Obviously, cutting forces affecting the tool 3 increase only gradually this way, which is helpful to reduce tool wear. Vice versa, these conditions are met at the end of the rough cut on the opposing side of the feature to machine, e.g., a tangential transition into the circular outfeed move that is also tangent to the part or workpiece 5 target contour 8 there.

This method is applied both to the case where the cut pattern includes linear rough cuts made from one side of the pocket to the other and also the scenario where the rough cuts follow a non-linear part or workpiece 5 target contour.

Concerning the optimization of smoothing radius, in a second processing act, the method provides an optimization of the smoothing radius in order to minimize the remaining material in corners 11. It provides that as much material is removed already by the last regular rough cut without generating infeed motions that would exceed the given limits for change of direction (minimum radius). The smoothing radius $rS\_n$ and $rE\_n$ is continuously reduced in the sequence of rough cuts, (e.g., from layer to layer), in a way that honors the maximum admissible cut depth at the beginning and at the end of the rough cut. At the same time, our method provides that the smoothing radius $rS\_n$ and $rE\_n$ is computed to be as large as possible for best cutting conditions during infeed and outfeed of the tool. In this context, the system already adjusts the initial radius accordingly, if this may be necessary for the first rough cut in the pattern.

Concerning the contiguous rough cuts creation, in the third processing act, our method provides the generation of cutting moves in a contiguous zig-zag pattern. In layer n−1, having met the uppermost point of tangency (dot labeled "S_n−1"), the tool 3 begins its circular infeed move and continues the linear rough cut towards the left side. When returning on the next lower cut level n towards the right again, it meets point "E_n", continues along the profile up to point "S_n−1", changes direction and moves back towards "E_n" in the opposite direction. From here, it continues to cut towards point "S_n+1", and, the next circular infeed towards the left side is started then, etc. Thus, a contiguous sequence of smooth and directly connected rough cuts may be obtained. Both cutting sides of the tool 3 are equally employed this way further reducing tool wear.

In summary, the described computer-implemented method has the advantage is that it requires less programming time and has a higher efficiency for nc-programming department then other approaches. Compared to yet other approaches, the presented computer-implemented method results in faster machining, less tool wear, reduced tooling cost, increases tool reach, less material remainders in corners 11, and less finishing work required. In particular, the contiguous cuts and smoothing functionality allows for shorter tool paths which lead to reduced cycle times, positive thermal effects specific to contiguous cuts pattern, e.g., because the heat conduction is increased thru increased tool to workpiece contact. Further, an automatic smoothing radius reduction, and an automatic tool path generation is achieved which requires just a few input parameters. Further, the presented computer-implemented method offers advanced functionality for lathe nc-programming and thus constitutes an attractive offering in the turbine machining market segment. The discussed methods contributes to an advanced solution portfolio that provides a clear differentiator among competitors in lathe nc-programming. Also, synergy effects are gained from the disclosure for other market segments, e.g. special new turning applications in machinery or manufacturing of large bearings.

Figure 5:
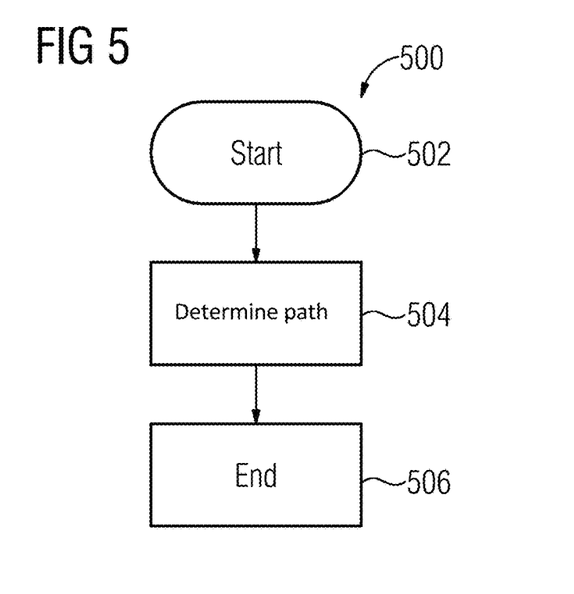
FIG. 5 illustrates a flow diagram of an example methodology that facilitates machining of workpieces using lathes, in particular to determining a cut pattern of a lathe, in a product system.

FIG. 5 illustrates a flow diagram of an example methodology 500 that facilitates machining of workpieces 5 using lathes 2, in particular to determining a cut pattern 1 of a lathe 2, in a product system 100. The method may start at act 502 and the methodology may include several acts, e.g. carried out through operation of the control device 6 or the lathe 2.

These acts may include an act 504 of determining a path of a n-th layer of the cut pattern 6. Herein, the n-th layer may include: for $n \geq 2$: an infeed path which is linear and/or parallel to the target contour 8 starting at point E_n−1 and ending at point S_n; a circular infeed path starting tangent to the target contour 8 at point S_n with a radius $rS\_n$ and ending at point IS_n; an intermediate path which is linear and/or parallel to the target contour 8 starting at point IS_n and ending at point IE_n; a circular outfeed path starting at point IE_n and ending tangent to the target contour 8 at point E_n with a radius $rE\_n$; and for $n \geq 2$: a smoothing path which is linear and/or parallel to the target contour 8 starting at point E_n, including point S_n−1, and ending at point E_n.

At act 506, the methodology may end.

In certain examples, the methodology 500 may include other acts and features discussed previously with respect to the processing system 100 or the computer-implemented method. By way of example, the methodology may include the act of providing a start contour 7 and a target contour 8 of the workpiece 5 to be achieved by cutting the workpiece 5 according to the cut pattern 1. In another example, the methodology may include the act of operating the lathe 2 through the control device 6 such that the workpiece 5 is cut according to the determined cut pattern 1. Further, the methodology may include acts of receiving a user's input to the above-mentioned input parameters, of displaying parameters of the cut pattern, of communicating with connected software solutions, such as CAD, PLM and the like.

In particular, the above examples are equally applicable to the control device 6, to the lathe 2 and to the corresponding computer-readable medium 10 explained in the present patent document, respectively.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, software components may be written in and/or produced by software environments/languages/frame-works such as Java, JavaScript, Python, C, C#, C++ or any other software tool capable of producing components and graphical user interfaces configured to carry out the acts and features described herein.

Figure 6:
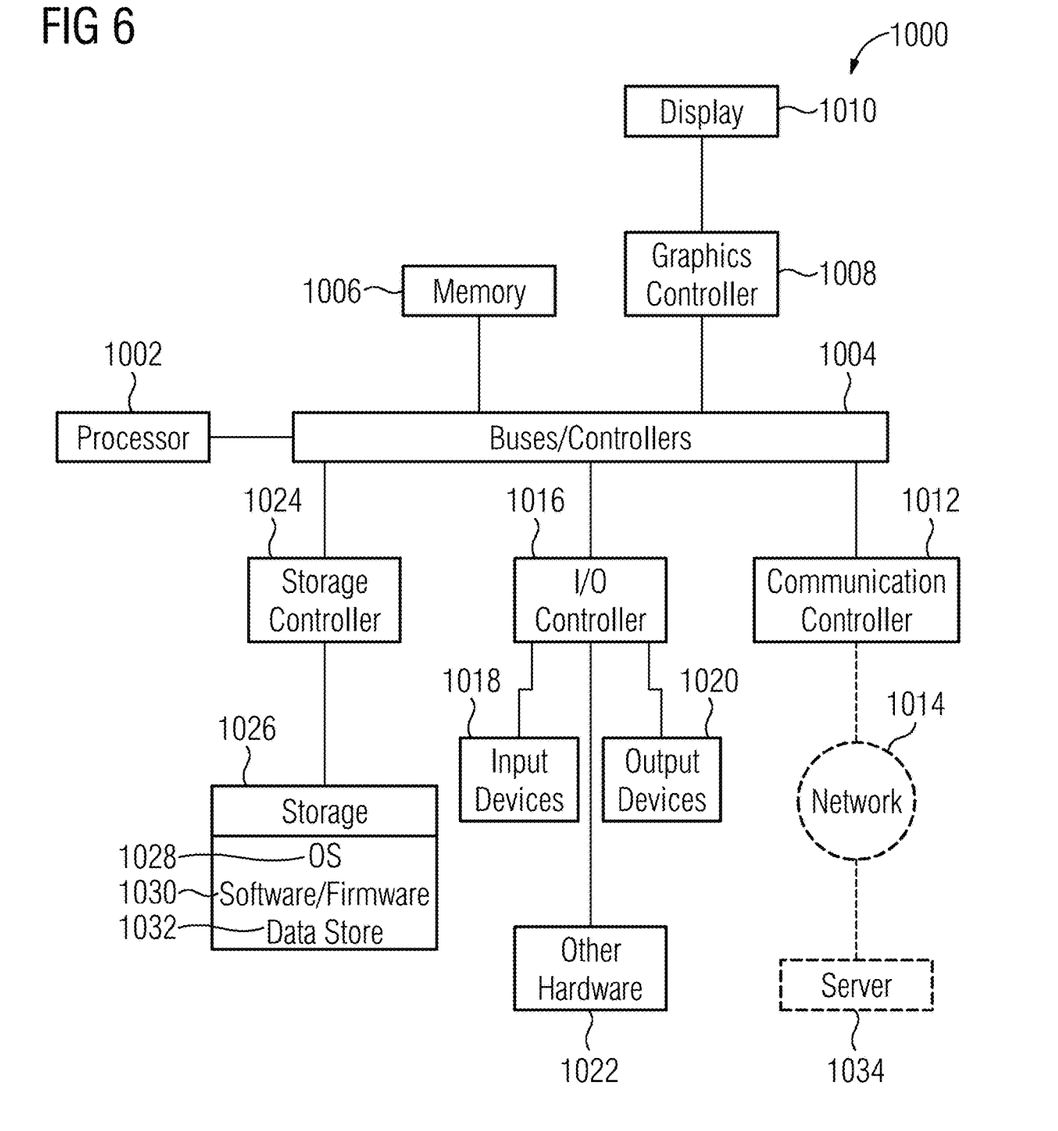
FIG. 6 illustrates a block diagram of an example of a data processing system in which an embodiment may be implemented.

FIG. 6 illustrates a block diagram of a data processing system 1000 (also referred to as a computer system) in which an embodiment may be implemented, for example, as a portion of a product system, and/or other system operatively configured by software or otherwise to perform the processes as described herein. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments, one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). In certain examples, various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA).

A storage controller may be connected to a storage device 1026 such as one or more storage drives and/or any associated removable media, which may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (e.g., CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to the above-described control device 6, a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, the words or phrases used herein may be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act may be termed a second element, function, or act, and, similarly, a second element, function, or act may be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. A processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, which must be included in the claim scope: the scope of patented subject matter is defined only by the allowed claims. Moreover, none of these claims are intended to invoke 35 USC § 112(f) unless the exact words "means for" are followed by a participle.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for determining a cut pattern of a lathe which is numerically controlled by a control device and which comprises a tool with a cutter acting on a workpiece, the workpiece having a start contour and a target contour to be achieved by cutting the workpiece according to the cut pattern, the method including:
   determining a path of a n-th layer of the cut pattern, the n-th layer comprising:
      for n≥2: an infeed path which is linear and/or parallel to the target contour starting at point E_n−1 and ending at point S_n;
      a circular infeed path starting tangent to the target contour at the point S_n with a radius rS_n and ending at point IS_n;
      an intermediate path which is linear and/or parallel to the target contour starting at the point IS_n and ending at point IE_n;
      a circular outfeed path starting at the point IE_n and ending tangent to the target contour at point E_n with a radius rE_n; and
      for n≥2: a smoothing path which is linear and/or parallel to the target contour starting at the point E_n, including point S_n−1, and ending at the point E_n.

2. The computer-implemented method of claim 1, wherein for the n-th layer:
   the circular infeed path ends at the point IS_n tangent to the intermediate path starting at the point IS_n; and
   the circular outfeed path and starts at the point IE_n tangent to the intermediate path ending at the point IE_n.

3. The computer-implemented method of claim 2, wherein the radii of the circular infeed and outfeed paths rS_i and rE_i of an initial layer are larger than the radii of the circular infeed and outfeed paths rS_f and rE_f of a final layer of the cut pattern.

4. The computer-implemented method of claim 2, wherein the radius rS_n and the point IE_n of the respective circular infeed path as well as the radius rE_n and the start point IS_n of the respective circular outfeed path are determined such that a given maximum cut depth is respected.

5. The computer-implemented method of claim 2, wherein the radius rS_n of the circular infeed path and the radius rE_n of the circular outfeed path is decreased from layer n to layer n+1, respectively.

6. The computer-implemented method of claim 2, wherein radius rS_f of the circular infeed path and radius rE_f of the circular outfeed path of a final layer are determined such that a maximum amount of material of the workpiece is removed and such that a given limit of change of direction of the tool with the cutter is respected.

7. The computer-implemented method of claim 2, wherein, for a start contour and/or a target contour which does not require a circular infeed path for a given p-th layer with p<i, a linear infeed path is determined which is linear and/or parallel to the target contour starting at point S_p and ending at point IS_p, or
   wherein, for a start contour and/or a target contour which does not require a circular outfeed path for a given p-th layer with p<i, a linear outfeed path is determined which is linear and/or parallel to the target contour starting at point IE_p and ending at point E_p.

8. The computer-implemented method of claim 2, wherein the n-th layer further comprises an overlap path subsequent to the smoothing path of the n-th layer, and wherein, for the overlap path, a movement along the smoothing path is continued linearly and/or parallelly to the target contour starting at point S_n−1 for a distance d_o until a point To_n, and ending at point S_n−1.

9. The computer-implemented method of claim 2, wherein the control device controls the lathe such that the workpiece is cut according to the determined cut pattern.

10. The computer-implemented method of claim 1, wherein the radii of the circular infeed and outfeed paths rS_i and rE_i of an initial layer are larger than the radii of the circular infeed and outfeed paths rS_f and rE_f of a final layer of the cut pattern.

11. The computer-implemented method of claim 1, wherein the radius rS_n and the point IE_n of the respective circular infeed path as well as the radius rE_n and the start point IS_n of the respective circular outfeed path are determined such that a given maximum cut depth is respected.

12. The computer-implemented method of claim 1, wherein the radius rS_n of the circular infeed path and the radius rE_n of the circular outfeed path is decreased from layer n to layer n+1, respectively.

13. The computer-implemented method of claim 1, wherein radius rS_f of the circular infeed path and radius rE_f of the circular outfeed path of a final layer are determined such that a maximum amount of material of the workpiece is removed and such that a given limit of change of direction of the tool with the cutter is respected.

14. The computer-implemented method of claim 1, wherein, for a start contour and/or a target contour which does not require a circular infeed path for a given p-th layer with p<i, a linear infeed path is determined which is linear and/or parallel to the target contour starting at point S_p and ending at point IS_p, or
   wherein, for a start contour and/or a target contour which does not require a circular outfeed path for a given p-th layer with p<i, a linear outfeed path is determined which is linear and/or parallel to the target contour starting at point IE_p and ending at point E_p.

15. The computer-implemented method of claim 1, wherein the n-th layer further comprises an overlap path subsequent to the smoothing path of the n-th layer, and
   wherein, for the overlap path, a movement along the smoothing path is continued linearly and/or parallelly to the target contour starting at point S_n−1 for a distance d_o until a point To_n, and ending at point S_n−1.

16. The computer-implemented method of claim 1, wherein the control device controls the lathe such that the workpiece is cut according to the determined cut pattern.

17. A control device for numerically controlling a lathe, the lathe comprising a tool with a cutter acting on a workpiece, the workpiece having a start contour and a target contour to be achieved by cutting the workpiece according to a cut pattern,
   wherein the control device is arranged and configured to determine the cut pattern of the lathe by the following:

determine a path of a n-th layer of the cut pattern, the n-th layer comprising:
- for n≥2: an infeed path which is linear and/or parallel to the target contour starting at point E_n−1 and ending at point S_n;
- a circular infeed path starting tangent to the target contour at the point S_n with a radius rS_n and ending at point IS_n;
- an intermediate path which is linear and/or parallel to the target contour starting at the point IS_n and ending at point IE_n;
- a circular outfeed path starting at the point IE_n and ending tangent to the target contour at point E_n with a radius rE_n; and
- for n≥2: a smoothing path which is linear and/or parallel to the target contour starting at the point E_n, including point S_n−1, and ending at the point E_n.

18. The control device of claim 17, wherein the control device is arranged and configured to control the lathe such that the workpiece is cut according to the determined cut pattern.

19. A lathe comprising:
a tool with a cutter acting on a workpiece; and
a control device for numerically controlling the lathe,
wherein the workpiece has a start contour and a target contour to be achieved by cutting the workpiece according to a cut pattern, and
wherein the control device is arranged and configured to determine the cut pattern of the lathe by determining a path of a n-th layer of the cut pattern, the n-th layer comprising:
- for n≥2: an infeed path which is linear and/or parallel to a target contour starting at point E_n−1 and ending at point S_n;
- a circular infeed path starting tangent to the target contour at the point S_n with a radius rS_n and ending at point IS_n;
- an intermediate path which is linear and/or parallel to the target contour starting at the point IS_n and ending at point IE_n;
- a circular outfeed path starting at the point IE_n and ending tangent to the target contour at point E_n with a radius rE_n; and
- for n≥2: a smoothing path which is linear and/or parallel to the target contour starting at the point E_n, including point S_n−1, and ending at the point E_n.

* * * * *